Nov. 28, 1961  F. M. ROBERTS  3,010,224
EDUCATIONAL AMUSEMENT DEVICE
Filed Jan. 23, 1959  6 Sheets-Sheet 1

INVENTOR
FRANCIS M. ROBERTS
BY Stevens, Davis, Miller & Mosher
ATTORNEYS

Nov. 28, 1961

F. M. ROBERTS 3,010,224

EDUCATIONAL AMUSEMENT DEVICE

Filed Jan. 23, 1959

INVENTOR

FRANCIS M. ROBERTS

BY Stevens, Davis, Miller & Mosher

ATTORNEYS

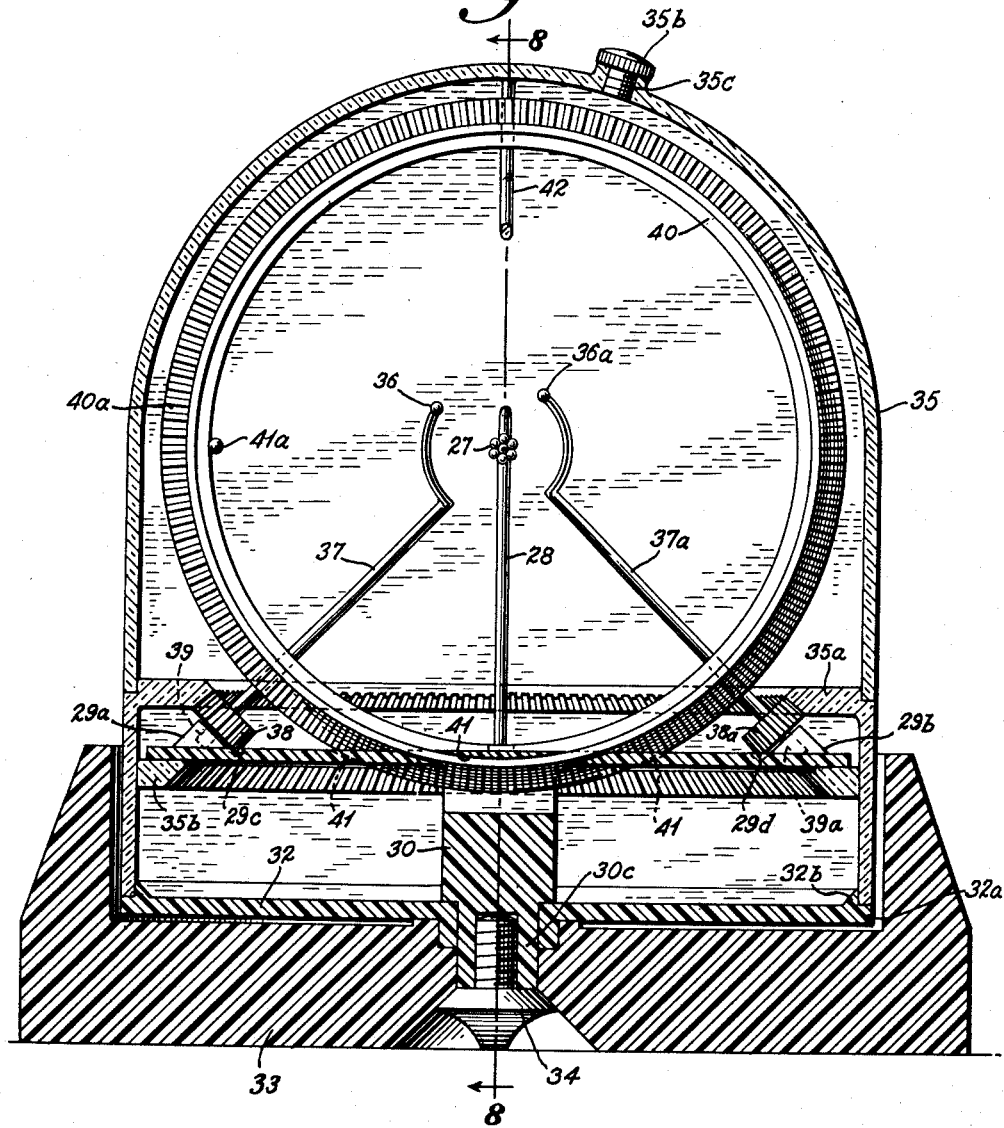

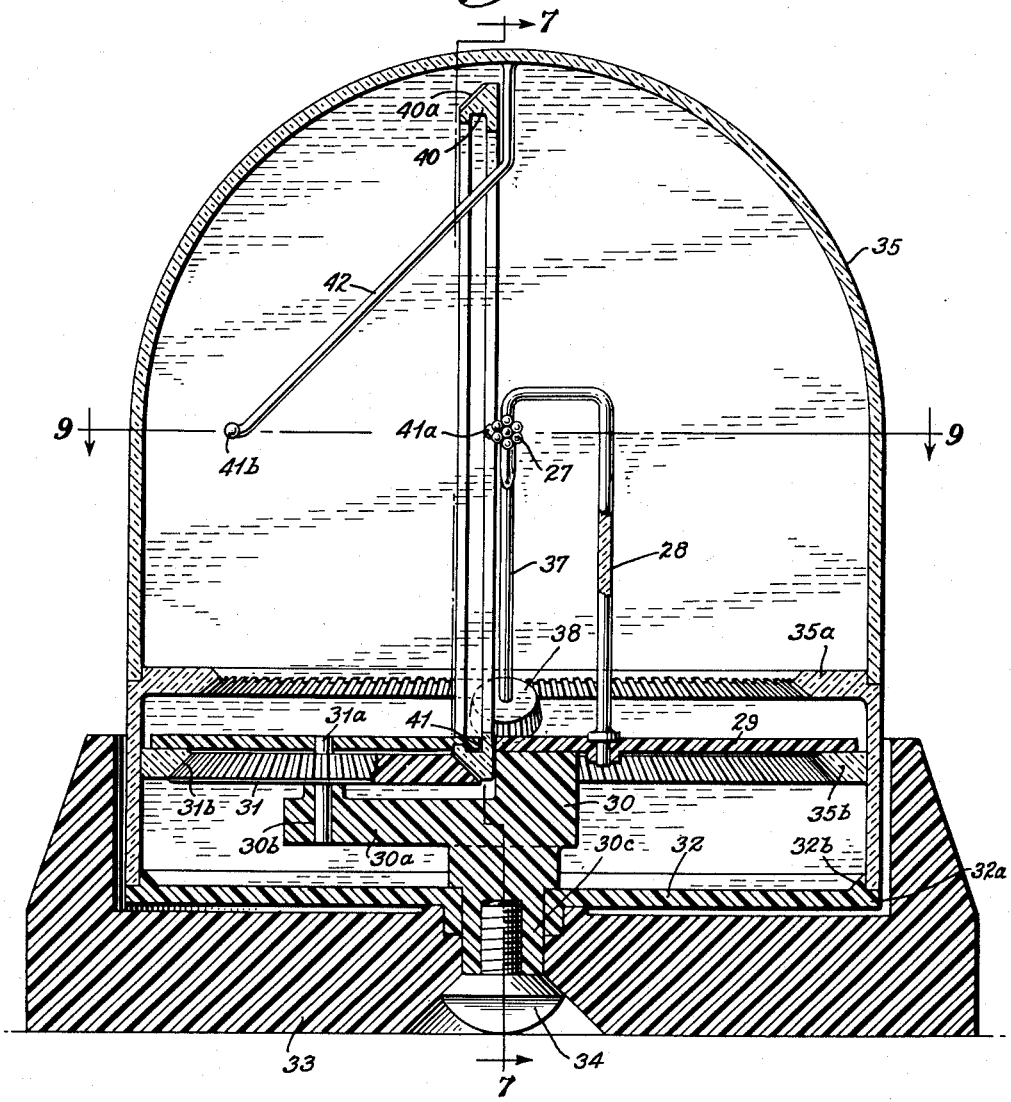

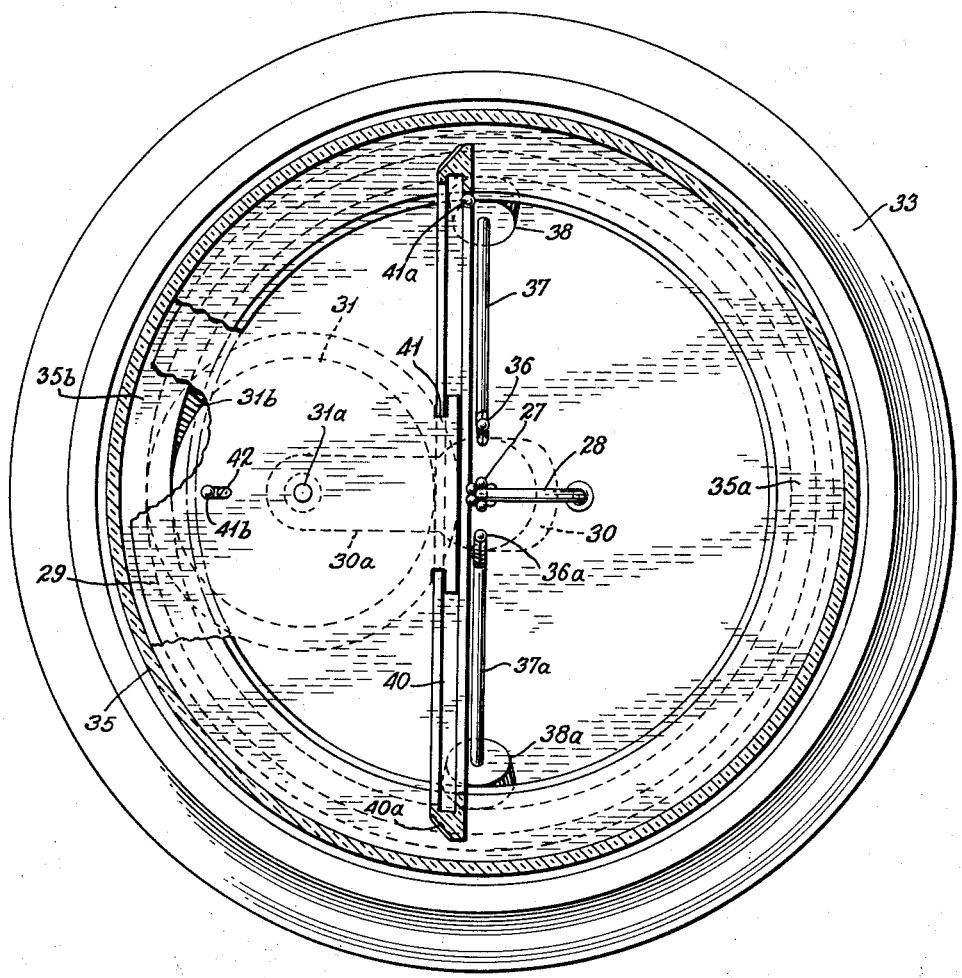
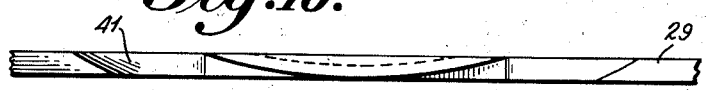
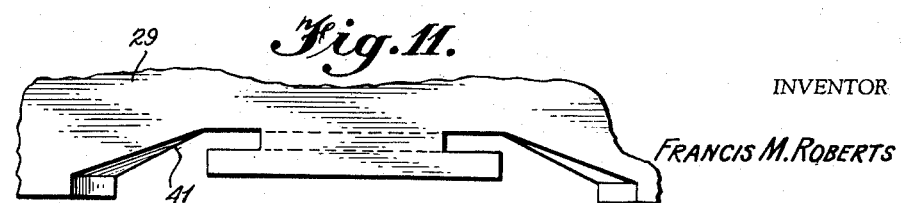

United States Patent Office 3,010,224
Patented Nov. 28, 1961

3,010,224
EDUCATIONAL AMUSEMENT DEVICE
Francis Marion Roberts, 1608 19th St. NW.,
Washington, D.C.
Filed Jan. 23, 1959, Ser. No. 788,644
1 Claim. (Cl. 35—18)

This invention relates to devices in which a mass is suspended in space by a member which is rendered invisible to the unaided eye by immersion in a medium characterized by an index of refraction of substantially the same value as the index of refraction of the member. More particularly, this invention relates to devices for graphically portraying naturally occurring systems in which a mass moves in a cyclic path and is retained in said path by invisible forces.

There are a number of instances where a device having characteristics that attract and hold the attention of individuals may be utilized desirably. This quality is of utmost importance in the contrivance of effective advertising devices, the manufacture of toys which stimulate the interest and curiosity of children, and the construction of various aids to education and teaching techniques to name but a few applications.

The utilization of chemical and physical phenomena to create striking impressions in the viewer is widespread. The property of transparency has long been of value in advertising displays as well as in countless other applications. Magnetism is sometimes used to create unusual effects which compel the attention of an observer. The employment of air or gas jets to support objects in space is a means often adopted to create the fascinating illusion of an object floating in space with no force acting to sustain it in its position there. These, and other such instances will come readily to mind. It will be apparent that if physical properties which are relatively little understood or seldom encountered by the general public are made use of in the creation of novel and intriguing devices of a type ordinarily employed in the advertising, educational or toy fields, such devices will be objects of considerable demand for their interest-attracting and holding abilities.

Accordingly, the present invention is contrived with a view to the employment of the phenomena of refractive index to create novel devices in which an object carried or supported by a member is made to appear to exist in open space without any visible means of support. The invention in its broadest aspect resides in the immersion of both the supporting member and object in a fluid, the refractive index of which is substantially identical to that of the supporting member. By this means the supporting member is rendered invisible to an observer and all that is seen is the object. The possible applications of this inventive concept are myriad and we have chosen to describe and illustrate only a few of the more readily conceivable adaptations of the broad concept and concurrently to suggest briefly other useful applications.

Thus, within the broad inventive concept declared above, the invention described herein further resides in a transparent container containing therein a transparent fluid. Within the container, a body, or plurality of bodies, which may represent the planets of the solar systems, or artificial earth satellites, or the electrons of an atom are mounted upon shaft-like supporting members for movement through the transparent fluid with a motion simulating the actual movements or orbits of these bodies in their natural environment.

Located generally in the center of the container, a mass corresponding to the earth, the sun, or the nucleus of the atom as the case may be, is mounted upon a stationary shaft. All the supporting shafts of the planets, earth, sun, satellites, nucleus and electrons are constructed from a transparent material which possesses a refractive index of substantially the same value as that of the transparent fluid. The effect thus obtained is one of planets or electrons or satellites revolving in their orbits about a central body and apparently being retained therein by no other forces than those which actually act to accomplish this result in the natural system. In these settings our invention is effective, for example, in stimulating the interest of children in astronomy, in space exploration, and in nuclear physics as well as in providing for the tuition of these subjects in educational institutions.

It is accordingly a broad object of this invention to provide a device that will stimulate interest and attract attention.

In this relation, it is a major object of this invention to provide a device which is susceptible of embodiment as a piece of scientific or educational apparatus, or as a toy, through the use of which an especially vivid conception of certain natural systems and phenomena can be acquired and taught.

A further object of this invention is to reproduce, as nearly as possible, the general appearance, the relations and the movements of the planets and to simulate as closely as possible, the sense of these bodies as suspended in space and traveling in their natural courses without visible means of locomotion.

It is also an object of the present invention to provide a device of this general character which is not limited to the representation of the solar system, but which can be modified so as to enable it to simulate other celestial objects or groups of objects such as constellations, multiple stars, and other astronomical phenomena occurring beyond the limits of the solar system.

A further object of this invention is to stimulate as authentically as possible the orbiting about the earth of currently existing artificial satellites.

Another object of the subject invention is to provide a working model of a beryllium atom in which the electrons of the atom orbit about the nucleus without visible means of support or locomotion.

Still another object of the invention is to provide an educational device or toy of the character described, which is simple in design, inexpensive to manufacture, and which is effective for the intended educational purposes.

The invention possesses other objects and features of advantage, some of which, with the foregoing, will be set forth in the following description of the embodiments of our invention which are illustrated in the accompanying drawings. It is to be understood that we do not limit ourselves to the embodiments depicted in the accompanying drawings and described in the specification, as variations and departures from these embodiments are conceivable within the scope of the claimed invention.

Referring to the drawings:

FIGURE 3a is a detail of a locking means for locking the circular rings of FIGURES 3 and 4 in their slots.

FIGURE 5 is a sectional view along the lines 5—5 of FIGURE 4.

FIGURE 6 is a sectional view along the lines 6—6 of FIGURE 4.

FIGURE 7 is an elevational view in section of a beryllium atom model utilizing my invention, the section being taken along the line 7—7 of FIGURE 8.

FIGURE 8 is an elevational view in section of the model depicted in FIGURE 7 and is taken along the line 8—8 of FIGURE 7.

FIGURE 9 is a plan view in section taken along the line 9—9 of FIGURE 8.

FIGURE 10 is a detail in elevation of the slot in the base plate of the model beryllium atom through which the outermost electron ring passes as it rotates.

FIGURE 11 is a plan view of the slot depicted in FIGURE 10.

Figure 1:
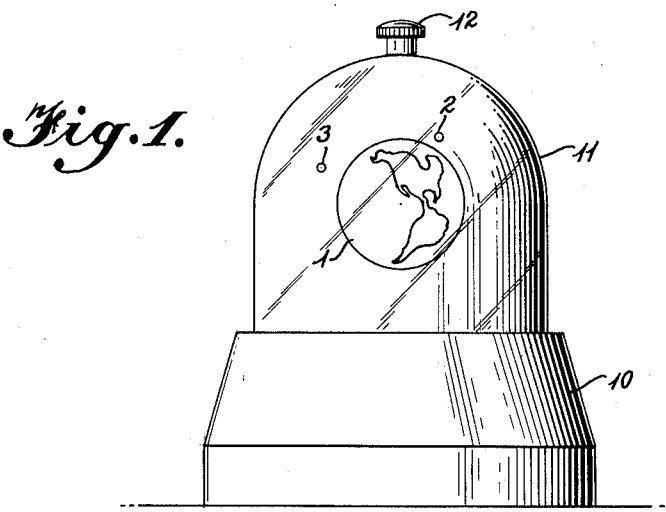
FIGURE 1 is an elevational view of a device employing our invention to graphically portray the planet Earth with its two currently existing artificial satellites showing the Earth and the satellites as they actually appear to an observer of the device.
Figure 2:
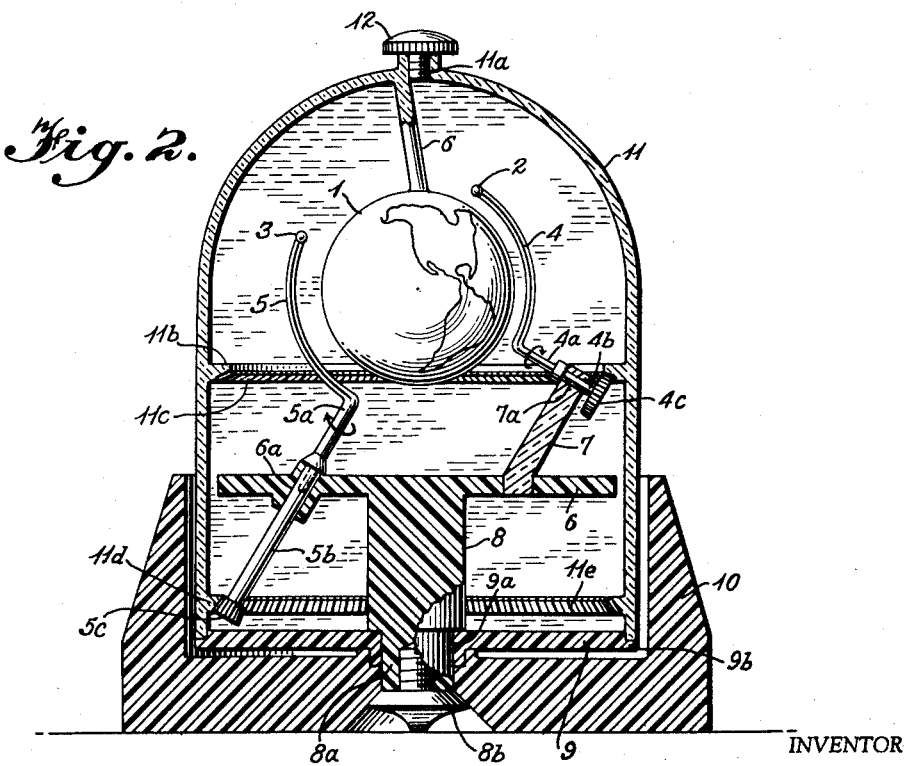
FIGURE 2 is a vertical section of the device shown in FIGURE 1 with parts invisible to the casual observer of the finished device being visibly depicted.

Referring first to FIGURES 1 and 2 the apparatus there depicted has three bodies 1, 2 and 3 representing the Earth, artificial satellite Sputnik and artificial satellite Explorer, respectively. The satellites are supported by support members 4 and 5 and the Earth is suspended upon suspension member 6. Support members 4 and 5 are integrally connected to shafts 4a and 5a, respectively. Connected to shafts 4a and 5a are shaft extensions 4b and 5b, respectively, which carry at their ends opposite the ends joining shafts 4a and 5a, gear members 4c and 5c, respectively. The shaft extensions 5b and 4b pass through journals 6a and 7a in base plate 6 and base plate projection 7, respectively. A post 8 supports base plate 6 and carries at its lower end an integral projection 8a. The post projection 8a passes through a fluid tight bearing 9a in sub-plate 9 and by means of a locking bolt 8b, or other appropriate means, is rigidly secured to enclosing member 10.

A globe 11 made of transparent material whose lower end abuts in fluid tight relation the ledge 9b on sub-plate 9 surrounds the artificial satellites and their support members and shafts. The suspension member 6 depends from the top of the globe 11 and may be either machined integrally with the globe or attached thereto by any appropriate means. An opening 11a in the top of the globe 11 permits it to be filled with fluid and a cap or plug 12 prevents the escape of the fluid therefrom. Approximately midway of the height of the globe 11, a circumferential ledge 11b projects inwardly from the side of the globe. The ledge 11b carries gear teeth 11c which mesh with the gear member 4c when the globe is in place. Near the lower end of globe 11, a second circumferential ledge 11d projects inwardly from the side of the globe and carries gear teeth 11e which mesh with the gear member 5c when the globe is in place. The members 6, 8, 9 and 10 are preferably made of opaque material. The Earth and satellites 1, 2 and 3 are made of opaque material. All other members are of transparent material and are rendered invisible when globe 11 is filled with a fluid of appropriate refractive index.

Figure 3:
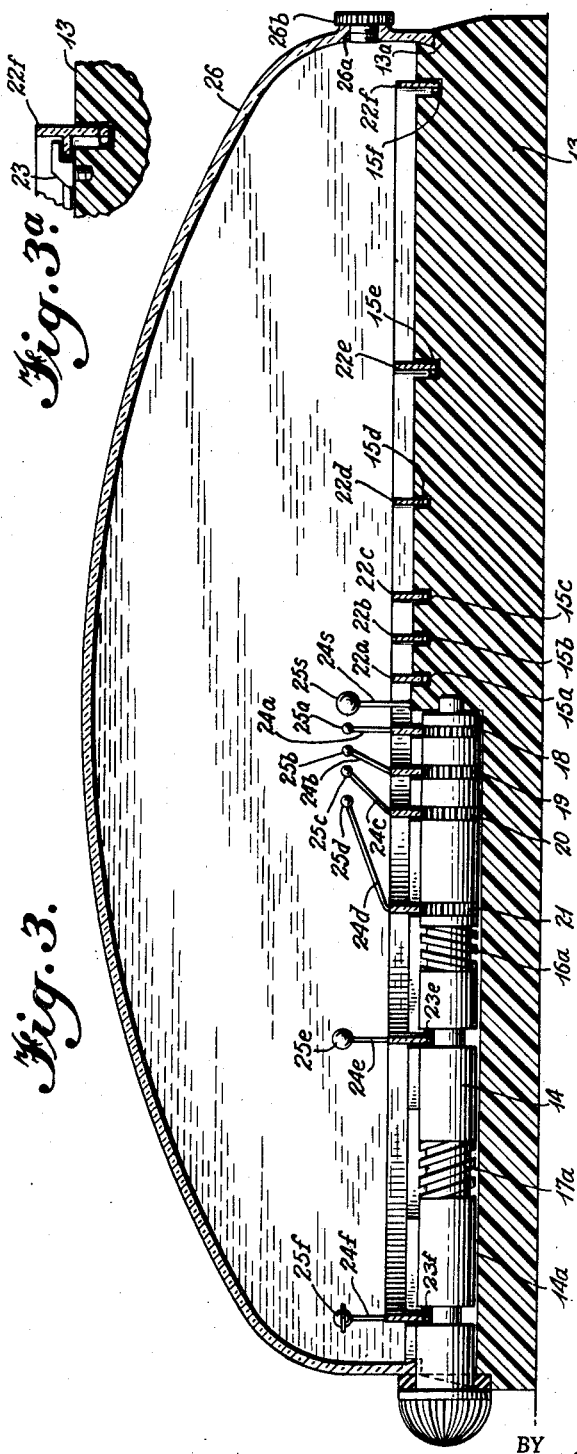
FIGURE 3 is a vertical section of a model solar system utilizing my invention taken along the line 3—3 of FIGURE 4.
Figure 4:
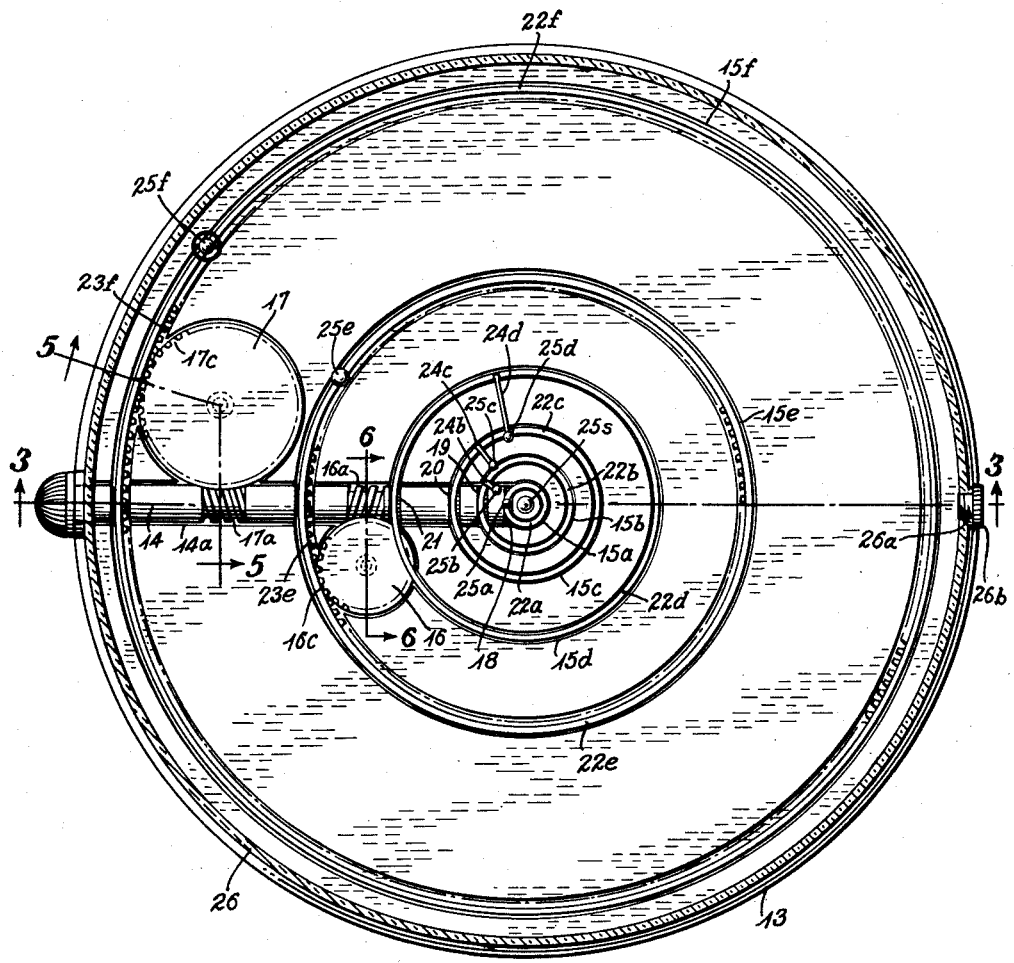
FIGURE 4 is a plan view of the model solar system of FIGURE 3.

In FIGURES 3 and 4 a model solar system employing my invention is shown. A disk shaped base member 13 is cast with a large radially extending slot 14a and six concentric circular grooves 15a, 15b, 15c, 15d, 15e and 15f formed in the upper surface of said base member. The upper surface of the base member 13 also is recessed to accommodate two circular idler gears 16 and 17. Resting in the radially extending slot 14a is a cylindrical gear shaft 14 which carries in radially spaced relation along its length circumferential gear teeth at 18, 19, 20 and 21. The shaft 14 also is machined with circumferential worms at 16a and 17a.

The six concentric circular grooves carry circular rings 22a, 22b, 22c, 22d, 22e and 22f which are free to rotate in their respective grooves. In FIGURE 3a I have drawn a latching means 23 which may be utilized to retain the rings in their grooves.

The bearing surfaces of circular rings 22a, 22b, 22c and 22d carry gear teeth, not shown, which mesh with circumferential gear teeth 18, 19, 20 and 21. The lower portion of the inner periphery of circular rings 22e and 22f carry gear teeth 23e and 23f which mesh with idler gears 16 and 17, respectively. (See FIGURES 5 and 6.)

The circular idler gears 16 and 17 carry on their peripheries two sets of gear teeth 16b and 16c, and 17b and 17c, respectively. Teeth 16b and 17b are pitched to mesh with circumferential worms 16a and 17a, respectively, of shaft 14. Teeth 16c and 17c mesh with teeth 23e and 23f of circular rings 22e and 22f, respectively. (See FIGURES 5 and 6.)

Circular rings 22a, 22b, 22c, 22d, 22e and 22f have connected thereto at one point in their circumference, supporting members 24a, 24b, 24c, 24d, 24e and 24f, respectively, which in turn each support spheres 25a, 25b, 25c, 25d, 25e and 25f, respectively, which present the planets Mercury, Venus, Earth, Mars, Jupiter and Saturn in that order. In the center of base member 13, a sphere 25s, representing the Sun, is mounted upon supporting member 24s.

A hollow circular dome 26 of transparent material fits over the planets and their actuating mechanism and abuts ledge 13a of base member 13 in fluid-tight relationship. An opening 26a permits the dome to be filled with a fluid and a cap 26b is provided for closing the opening 26a to prevent escape of the fluid therefrom. Base member 13, radial shaft 14, idler gears 16 and 17, and the planets and sun are all constructed of opaque materials. All other members are transparent.

In FIGURES 7, 8 and 9, I have shown views of a model of a beryllium atom utilizing my invention. A cluster of small spheres 27 represents the nucleus of the atom. It is supported by an inverted-L-shaped member 28 which is rigidly fixed to base plate 29. A base plate support member 30 supports at its upper end the base plate 29. Arm 30a of the support member 30 has drilled therein a hole 30b which accommodates in bearing relation the stem 31a of circular idler gear 31. The root portion 30c of the support member passes through sub-plate 32 and into a hole in enclosing member 33 and is rigidly secured to the enclosing member 33 by locking bolt 34. The sub-plate 32 is in bearing engagement with support-member root portion 30c and enclosing member 33 so as to be freely rotatable about root portion 30c. Globe 35 is inverted over the nucleus with its lower edge abutting in fluid tight relation the ledge 32a and lip 32b of sub-plate 32. The globe 35 is formed with inwardly extending circumferential ledges 35a and 35b.

Two small spheres 36 and 36a represent the two electrons in the first electron shell of the beryllium atom. They are mounted upon shafts 37 and 37a which pass through gear members 38 and 38a and are socketed in journals 39 and 39a. These journal bearings are formed in pyramidal projections 29a and 29b or any other suitable projections machined integrally with, or attached to the base plate 29. If necessary, the base plate may be slightly recessed as shown at 29c and 29d to accommodate gear members 38 and 38a. The teeth of gear members 38 and 38a mesh with teeth machined upon the inner periphery of circumferential ledge 35a.

The circular idler gear 31 is rotatably supported by the arm 30a of base plate support member 30 as described above and carries, mounted upon its periphery, gear teeth 31b. The gear teeth 31b mesh with teeth machined upon the inner periphery of circumferential ledge 35b.

A ring of transparent material 40, whose radius of curvature is equal to that of the top portion of globe 35, passes through a precisely fitted slot 41 in base plate 29. (See FIGURES 10 and 11.) One of the surfaces of the ring 40 carries gear teeth 40a which mesh with the teeth 31b of idler gear 31. At one point in the circumference of ring 40, small sphere 41a is mounted and represents one electron in the second electron shell of the beryllium atom.

The second electron in the second electron shell of the beryllium atom is represented by sphere 41b mounted at the end of shaft 42, which is rigidly attached to dome 35.

A hole 35c is provided in dome 35 for filling the device with fluid and a cap 35d is utilized to prevent the escape of fluid from the dome.

*Operation*

Having described the construction of several devices utilizing our invention, we will now describe the operation of these devices.

As previously stated, our invention in its broad aspects resides in the employment of the phenomena of refractive index to create the illusion of objects floating in space without visible means of support. Accordingly, in our device portraying the planet Earth with its artificial satellites as depicted in FIGURES 1 and 2, the support members 4 and 5, suspension member 6, shafts 4a and 5a, shaft extension 5b and gear member 5c are all made of transparent material of a given refractive index. Base plate projection 7 and circumferential ledge 11b are made of transparent material of the same refractive index as the aforementioned components.

The base plate 6, and bodies 1, 2 and 3 are preferably made of opaque material. Body 1, representing the Earth, carries indicia portraying the continents and oceans.

The fluid with which the globe 11 is filled has a refractive index of substantially the same value as that of the transparent components mentioned above.

In operation, the globe 11 and sub-plate 9 are caused by any suitable means to rotate about post projection 8a. As the globe rotates the body 1, representing Earth, is caused to rotate, and the artificial satellites 2 and 3 are caused to orbit about the Earth through the gears 4c and 5c and the connecting shafts and support members. Since the supporting and actuating members are all transparent and of the same refractive index as the surrounding fluid, an observer can see only the Earth and its artificial satellites describing movements corresponding to their natural movements and apparently suspended in space.

The same principle is utilized in the model solar system and beryllium atom depicted by the remaining figures. In the solar system illustrated in FIGURES 3, 4, 5 and 6, all the supporting members 24a, 24b, 24c, 24d, 24e and 24f, are made of transparent material of a given refractive index. Those portions of the circular rings which project above the plane of the upper surface of the base member 13 are made of transparent material of the same refractive index as the supporting members. For convenience in manufacturing, it may be more desirable to construct the rings entirely of transparent material. The remaining components, except the dome 26, which is made of transparent material, are made of opaque material.

The spheres 25a, 25b, 25c, 25d, 25e and 25f representing the Sun and planets carry appropriate indicia to make the representation as realistic as possible. For example, the sphere 25f, representing Saturn, may carry about its circumference rings corresponding to the well known rings of that planet.

The fluid with which dome 26 is filled is of substantially the same refractive index as are the transparent components.

When the shaft 14 is rotated by any suitable means, circular rings 22a, 22b, 22c, 22d, 22e and 22f are caused to revolve and the planets then revolve about the sun 25s without any visible means of support or locomotion.

In order to cause the spheres 25f and 25e representing the planets Saturn and Jupiter to revolve about the sun 25s at a speed which corresponds proportionately to the actual speed, it is necessary to utilize idler gears 16 and 17 rather than to drive the rings 22f and 22e directly from shaft 14.

In the model beryllium atom depicted in FIGURES 7, 8, 9, 10 and 11, all portions of the device located above the base plate 29 with the exceptions of the spheres representing the nucleus and electrons of the atom, are constructed of transparent material of a given refractive index which is substantially identical to the refractive index of the fluid with which the globe 35 is filled.

In operation, the globe 35 is caused to rotate about the root portion 30c of the support member 30 by any suitable means. As the globe 35 rotates, gear members 38 and 38a and idler gear 31 are caused to rotate. Idler gear 31 meshes with the teeth 40a on ring 40 causing it to rotate, so that the sphere 41a, representing one of the outer shell electrons, orbits in a vertical plane about the nucleus 27 without visible means of support or locomotion. The rotation of gear members 38 and 38a causes inner shell electrons 36 and 36a to also orbit about the nucleus. With the rotation of globe 35, the sphere 41b mounted at the end of shaft 42 orbits about the nucleus in a horizontal plane. Since all of the electrons and nucleus support members are rendered invisible to the observer by selection of appropriate refractive indexes for the material of their construction and that of the fluid filling the globe, the impression to the observer of the finished device is that of a magnified beryllium atom suspended in space with no discernible means of support for its atomic particles and no visible means of actuation.

As exemplary of a very good transparent material and fluid which may be utilized in achieving the unique effect of our invention, the rigid transparent members may be constructed of cellulose acetate butyrate plastic having a refractive index of 1.46 to 1.48 according to the method of fabrication employed and the fluid employed may be liquid petrolatum, such as that marketed under the trade name Squibb mineral oil, which has a refractive index of 1.48 at ordinary room temperature. The latter is an especially desirable fluid for use in toys employing our invention inasmuch as it is non-corrosive and non-toxic.

As will be appreciated by those skilled in the art, the refractive index value of a fluid is subject to variation with variation in temperature. Under some conditions of use of our device or devices employing our invention, it will occasionally therefore happen that extremes in temperature may produce a sufficient variation in the refractive index of the fluid employed to cause loss of invisibility of the transparent structural members. This undesirable result may be avoided by the use of small amounts of fluid diluents which are incorporated in the primary fluid to bring its refractive index back to the desired value as evidenced by the return of invisibility. Thus, as accessories to our devices, small containers of diluents of higher and lower refractive index than the primary fluid could be provided.

We have purposely omitted a detailed description of the structural and engineering considerations in the manufacture of these devices employing our invention such as methods of achieving fluid tight fittings and design of bearings and journals and also gearing arrangements. Numerous techniques of construction of these details are known to the art and are not, per se, a part of our invention.

The structural members of my device which move through the fluid may be designed in air foil cross-section so that cavitation resulting from their movement may be reduced or eliminated.

It is our intention that the broad inventive concept of our invention include within its scope the employment of the phenomena of refractive index in devices through which electromagnetic waves lying without the range of human eye detection are passed. In such a device, certain members would have the same refractive index with respect to ultra and infra visible range electromagnetic waves as would the surrounding media in which they were immersed.

It will be appreciated that certain advantages will accrue from the use of a liquid as the fluid employed in my device such as lubrication of moving parts and ease of filling the surrounding domes or globes. On the other hand, if a gas is employed as the fluid cavitation problems will be reduced to a minimum.

The devices which we have described and illustrated are but illustrative embodiments of educational devices employing our invention and are not intended to limit in any way the inclusion of many other useful types of apparatus in which our broad inventive concept is utilized and which fall within the scope of the claim hereinafter set forth.

What I claim is:

An educational device comprising a transparent container, a liquid within said container, a plurality of bodies immersed in said liquid and corresponding in shape to naturally occurring bodies, rigid means supporting said bodies in said liquid against the action of gravity in a spacial arrangement corresponding in proportion to their natural spacial arrangement, means actuating said supporting means and bodies in motions corresponding to the natural motions of said bodies at least a portion of said actuating and supporting means being visually accessible through said transparent container, said visually accessible portion, being of substantially the same refractive index as said liquid, said visually accessible portion of said supporting means being of air-foil cross-section so that cavitation resulting from its movement in the liquid is largely prevented.

References Cited in the file of this patent

UNITED STATES PATENTS

| | | |
|---|---|---|
| 1,770,820 | Tomasevich | July 15, 1930 |
| 2,311,613 | Slayter | Feb. 16, 1943 |
| 2,312,158 | Garity | Feb. 23, 1943 |
| 2,427,435 | Wollner | Sept. 16, 1947 |

OTHER REFERENCES

Book: "The Science of Petroleum," by Dustan, Volume 4, TN 870/S4, page 2580 only.